United States Patent
Graber

(10) Patent No.: US 6,520,215 B2
(45) Date of Patent: Feb. 18, 2003

(54) TUBULAR BAR WITH INTEGRAL ROLLED LOCKING SYSTEM AND METHOD OF MAKING SAME

(75) Inventor: Donald G. Graber, Garden City, MI (US)

(73) Assignee: Hayes-Albion Corporation, Lebanon, NJ (US)

( * ) Notice: Subject to any disclaimer, the term of this patent is extended or adjusted under 35 U.S.C. 154(b) by 18 days.

(21) Appl. No.: 09/793,940

(22) Filed: Feb. 27, 2001

(65) Prior Publication Data

US 2002/0116974 A1 Aug. 29, 2002

(51) Int. Cl.⁷ .................................................. F16L 9/17
(52) U.S. Cl. ........................ 138/163; 138/106; 138/166; 138/169
(58) Field of Search ................................ 138/163, 106, 138/166, 169, 171

(56) References Cited

U.S. PATENT DOCUMENTS

| | | | |
|---|---|---|---|
| 1,141,188 A | * 6/1915 | Johnson | 138/163 |
| 2,975,874 A | * 3/1961 | Pagan | 138/163 |
| 3,129,624 A | 4/1964 | Auer | |
| 3,272,045 A | 9/1966 | Cookson | |
| 3,545,496 A | * 12/1970 | Wogerbauer | 138/171 |
| 3,704,643 A | 12/1972 | Cookson | |
| 3,803,966 A | 4/1974 | Plegat | |
| 3,805,654 A | 4/1974 | Plegat | |
| 4,407,179 A | 10/1983 | Iwase et al. | |
| 4,530,226 A | 7/1985 | Granzow et al. | |
| 4,627,254 A | 12/1986 | Kitsukawa et al. | |
| 5,080,427 A | 1/1992 | Sturrus et al. | |
| 5,092,512 A | 3/1992 | Sturrus et al. | |
| 5,104,026 A | 4/1992 | Sturrus et al. | |
| 5,305,625 A | 4/1994 | Heinz | |
| 5,306,058 A | 4/1994 | Sturrus et al. | |
| 5,395,036 A | 3/1995 | Sturrus | |
| 5,454,504 A | 10/1995 | Sturrus | |
| 5,523,529 A | * 6/1996 | Holliday | 138/163 |
| 5,566,874 A | 10/1996 | Sturrus | |
| 5,732,747 A | * 3/1998 | Holliday | 138/163 |
| 5,813,594 A | 9/1998 | Sturrus | |
| 5,816,217 A | 10/1998 | Ouchi et al. | |
| 5,899,239 A | * 5/1999 | Coulis | 138/163 |
| 5,924,457 A | * 7/1999 | Inaba et al. | 138/162 |
| 5,974,932 A | 11/1999 | Suzuki et al. | |
| 6,182,706 B1 | * 2/2001 | Tako et al. | 138/156 |

* cited by examiner

Primary Examiner—James Hook
(74) Attorney, Agent, or Firm—Dykema Gossett PLLC

(57) ABSTRACT

The modular grill for vehicles such as trucks includes an elongated screen of generally rectangular configuration, with the longest dimension extending horizontally and with the screen having inner and outer surfaces. A plurality of vertically spaced elongated tubular bars are provided which extend horizontally across the screen in surface-to-surface contact with the outer surface of the screen. A plurality of vertically spaced straps are provided, one for each tubular bar, with the straps being in surface-to-surface contact with the inner surface of the screen. Fastening structure extend through the straps, screen and tubular bars for retaining the bars on the screen. A roll forming method is disclosed for making the tubular bar with an integral rolled locking system which extends the entire length thereof and holds the bar in tension. The bar is preferably sweep along its longitudinal axis to create a curvature consistent with modern automotive designs.

8 Claims, 6 Drawing Sheets

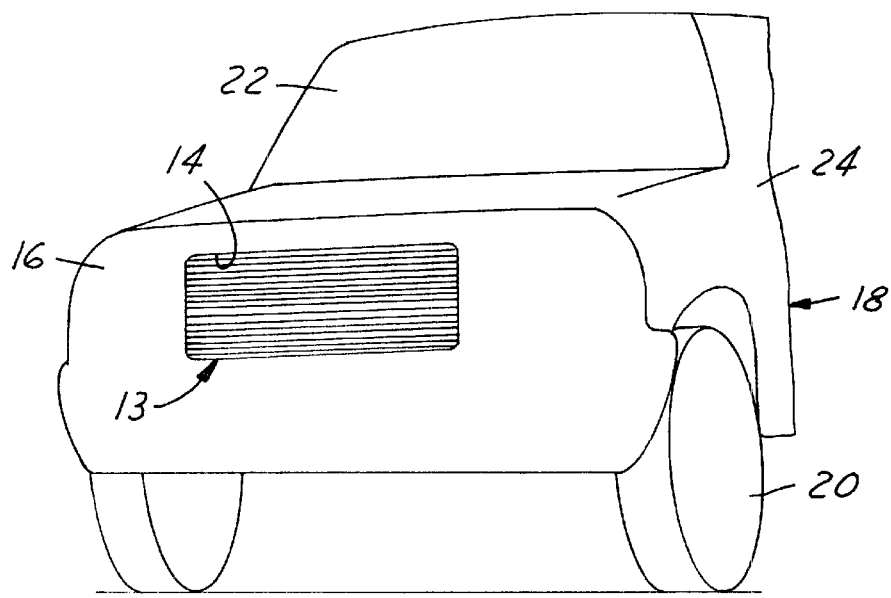
FIG. 1
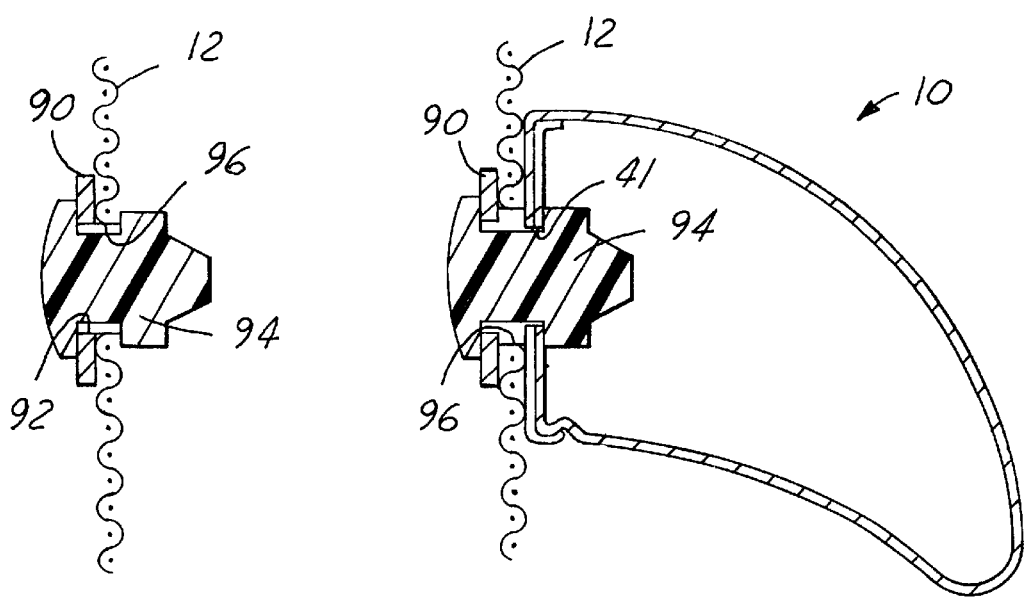
FIG. 3
FIG. 4

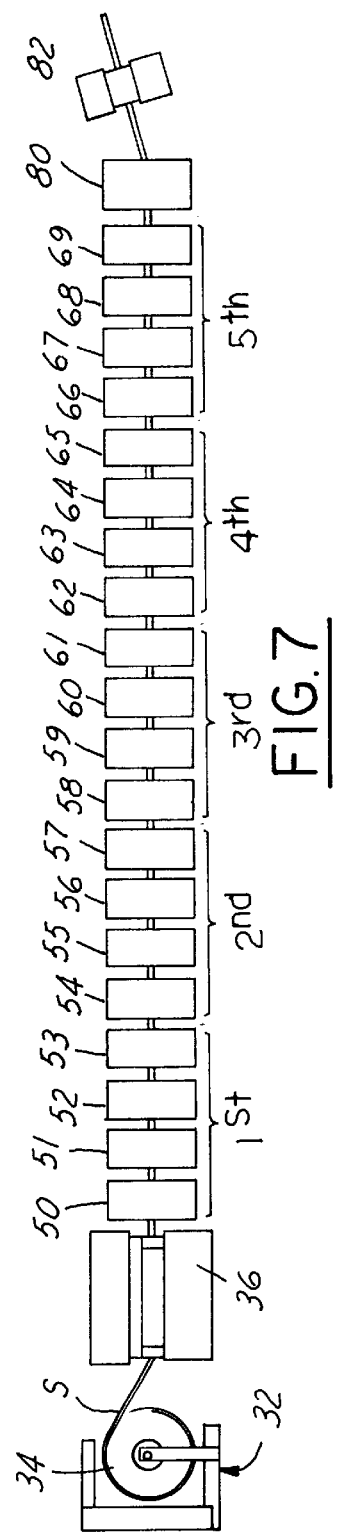

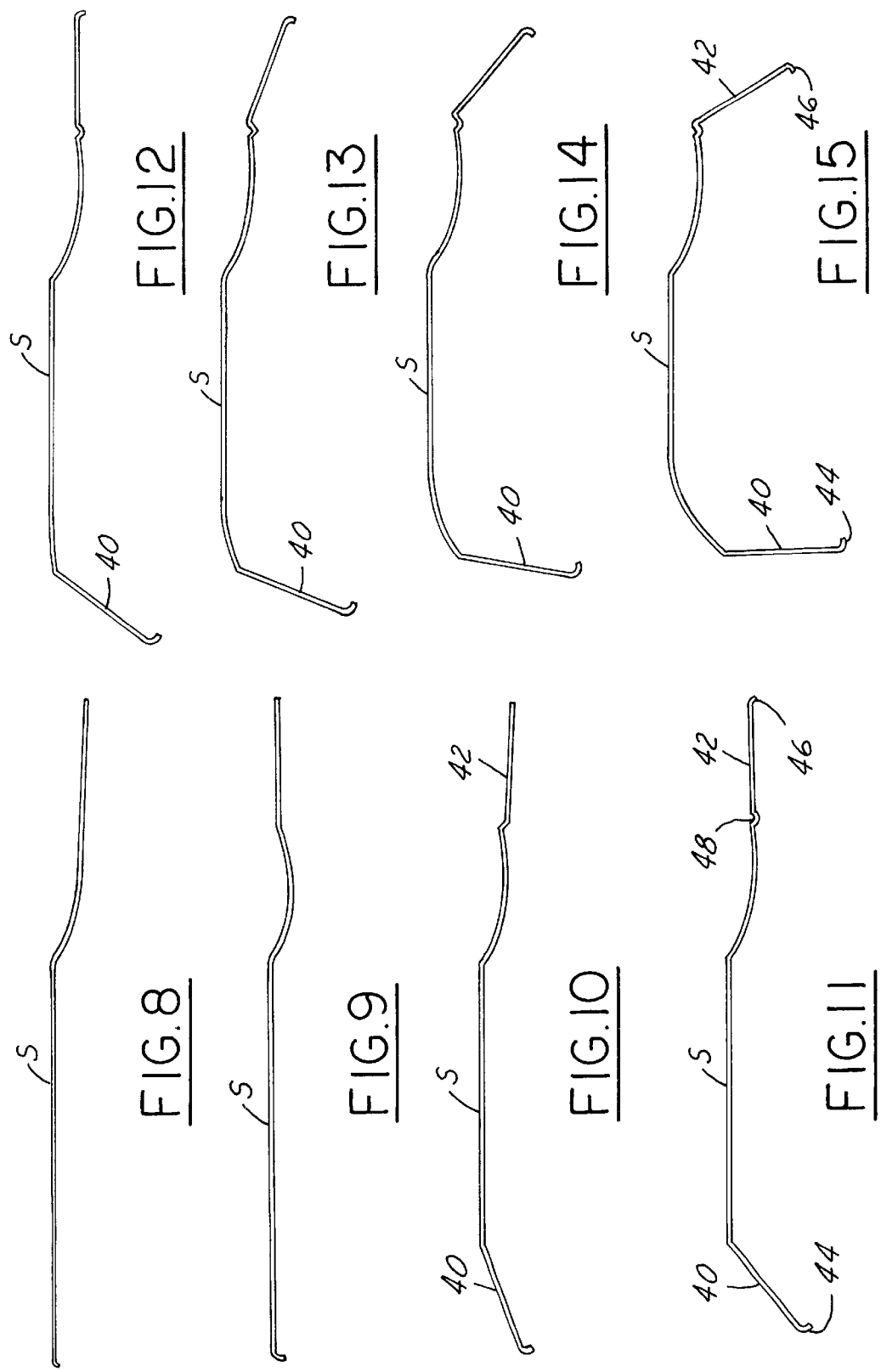

TUBULAR BAR WITH INTEGRAL ROLLED LOCKING SYSTEM AND METHOD OF MAKING SAME

FIELD OF THE INVENTION

This invention relates to automotive modular grills, primarily for trucks, and more specifically to roll-formed tubular members or bars with integral rolled locking systems which are used in the manufacture of the modular grills. Such tubular bars may be made from sheets of material of varying thickness taken from the group comprising stainless steel, high carbon steel, cold rolled steel and aluminum.

BACKGROUND OF THE INVENTION

The automotive industry utilizes tubular bars in a wide variety of areas such as for bumpers, grills, frames and elsewhere throughout the vehicle where strength, cost, ease of manufacture and reduction in weight are desired. Such automotive products are subject to a variety of design requirements due to consumer demands, government regulations and the competitiveness of the industry. Tubular bars used in modular truck grills must maintain a high level of strength and damage resistance to meet consumer expectations and government regulations concerning low speed vehicle impact. However, such tubular members or bars must also be of low weight to assist in minimizing vehicular dead weight which reduces gas mileage. In addition, the tubular bars utilize, as an example, in truck grills must have a low manufacturing cost and be of high dimensional consistency given the competitiveness of the industry.

SUMMARY OF THE INVENTION

The present invention relates to an automotive tubular bar and the method of making such bar made of a material taken from the group comprising stainless steel, high carbon steel, cold rolled steel and aluminum roll-formed into a tubular cross section, with the bar having a controlled width and an integral rolled locking system which extends the entire length of the bar and hold the body of the bar in tension as the bar exits the roll mill.

The bar may be made from a variety of materials of varying thickness and rolled into a variety of cross sectional shapes, with the tubular bar usable in various automotive applications such as truck grills, door tracks and modular floor systems, to name a few.

In the past, it was necessary to squeeze the tubular bar after it exited the roll mill in order to hold the tubular bar together or, in other cases, mechanism fasteners were utilized or welding was required to maintain the bar in a closed tubular configuration. With the present invention, applicant utilizes the spring-back characteristics of the material to actually hold or maintain the tension of the tubular bar or part without resorting to mechanical fasteners, welding or squeezing of the part together. It is the metal itself that holds the bar or part together.

By forming a closed tubular section, the strength of the bar is greatly increased. This allows weight reduction by use of reduced material thickness. In addition, another important feature of the present invention is the formation of a sweep after the roll-forming process had been completed, with the rolled locking mechanism or system in place prior to the sweeping process occurring. This sweeping step allows for the manufacturer of tubular bars which satisfy modern automotive designs, increase the strength of the bar and improves it spring-back characteristics.

It is a feature of the present invention to provide a tubular member or bar comprising an elongated body formed to an established width on a roll forming machine and having an integral rolled locking mechanism, with the body having a pair of interconnected side walls with inner and outer surfaces, each side wall having a flange extending towards the other side wall and terminating in a lip along the longitudinal edge thereof, with each lip and flange extending the entire length of the body.

Another feature of the present invention is to provide a tubular bar of the aforementioned type with the flanges overlying one another, with the inner surface of one flange in surface-to-surface contact with the outer surface of the other flange, with the outer surface of one side wall having an elongated groove extending from one end of the body to the other end, with the groove receiving the elongated lip provided on the flange connected to the other side wall whereby the last mentioned lip and groove form the rolled locking mechanism which extends the entire length of the body and hold the body in intension.

Still another feature of the present invention is providing a tubular bar of the aforementioned type wherein the side walls of the body are of arcuate cross section and are connected by a generally U-shaped section extending lengthwise of the body.

A further feature of the present is to provide a tubular bar of the aforementioned type wherein the body has a sweeping curvature along the longitudinal length thereof for matching the bar with the contour of the surface upon which it is to be mounted.

A still further feature of the present invention is to provide a tubular bar of the aforementioned type wherein the overlying flanges are provided with alined openings for fasteners which permit the mounting of the tubular bar on a surface.

Another feature of the present invention is to provide a method of forming tubular bars comprising the steps of continuously providing an elongated strip of material of a predetermined width taken from the group comprising stainless steel, high carbon steel, cold rolled steel and aluminum and continuously moving the strip of material through roll forming assemblies which have shapes that as the sheet of material is passed therethrough, the material is gradually and progressively formed in succession into tubular bars with integral rolled locking mechanisms which extends the entire length of the bars and holds each tubular bar in tension as the bar exits the roll forming assemblies.

Another feature of the present invention is to provide a method of forming tubular bars including the step of subjecting the body to a sweep along its longitudinal axis to create a curvature consistent with the surface on which the tubular member is to be mounted.

Additional advantages and features of the present invention will become apparent from the following description and the appended claims, taken in conjunctions with the accompanying drawings.

BRIEF DESCRIPTION OF THE DRAWINGS

FIG. 1 is a fragmentary perspective view of the front of a truck showing the modular grill.

FIG. 3 is a sectional view of the modular grill taken on the line 3—3 of FIG. 2.

FIG. 4 is a sectional view of the modular grill taken on the line 4—4 of FIG. 2 and illustrating the tubular bar and the method of mounting same.

FIG. 5 is a fragmentary view of the tubular bar taken on the line 5—5 of FIG. 2 and illustrating the sweep provided therein.

FIG. 6 is a fragmentary view of the sheet of material after exiting the pre-notch die and prior to the completion of the tubular bar.

FIG. 7 is a schematic view of the roll-forming apparatus for practicing the method or process of this invention.

FIGS. 8–11 inclusive are cross sectional views of the sheet of material moving through a first series of roll forming assemblies.

FIGS. 12–15 inclusive are cross sectional views of the sheet of material moving through a second series of roll forming assemblies.

DETAILED DESCRIPTION OF THE PREFERRED EMBODIMENT

Figure 2:
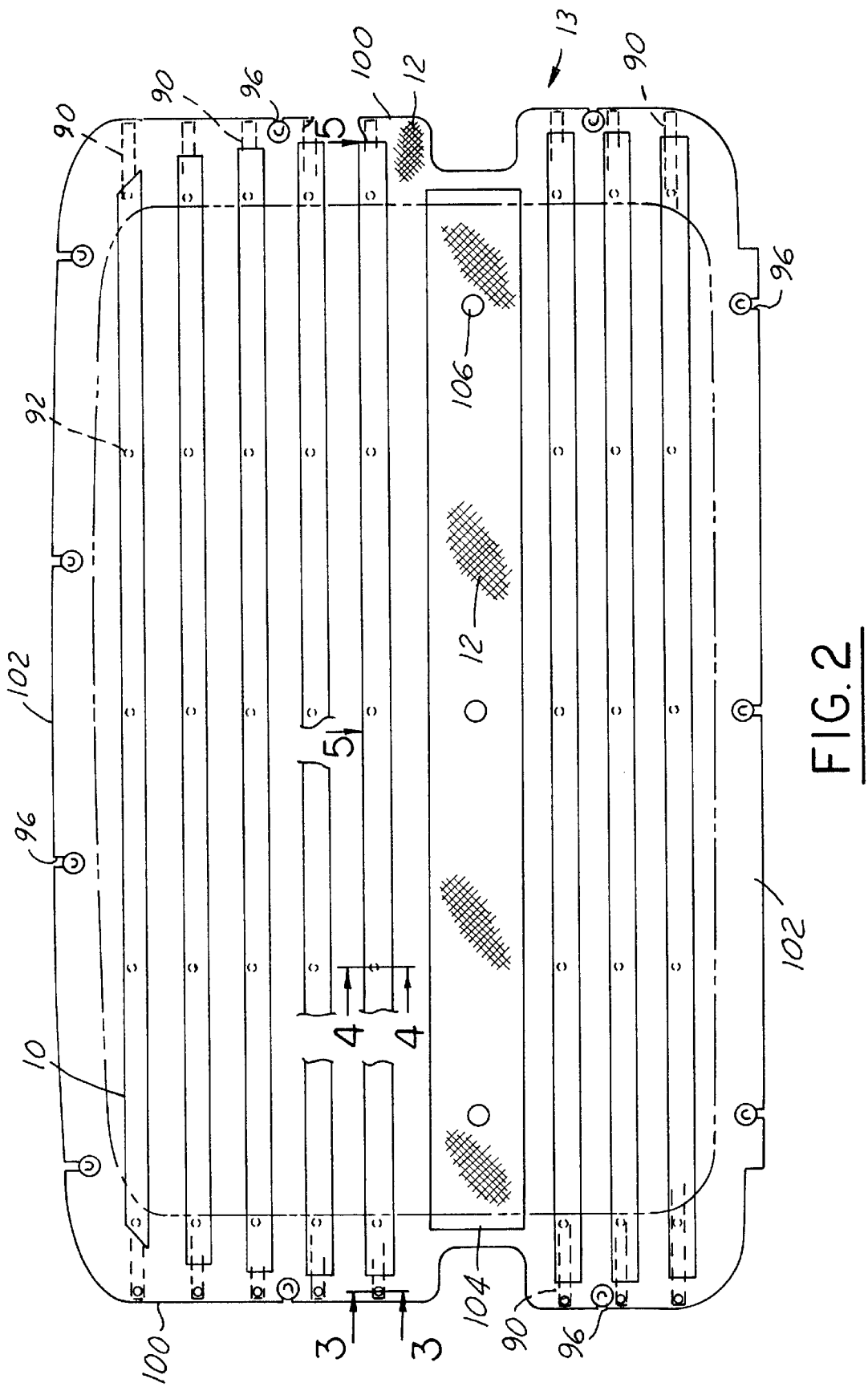
FIG. 2 is a front elevational view of the modular grill for mounting in the opening provided in the truck.
Figure 16:
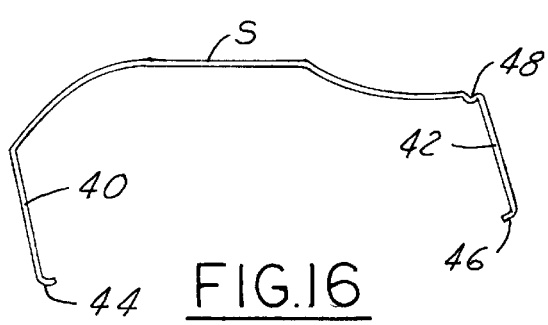
FIGS. 16–19 inclusive are cross sectional views of the sheet of material moving through a third series of roll forming assemblies.
Figure 20:
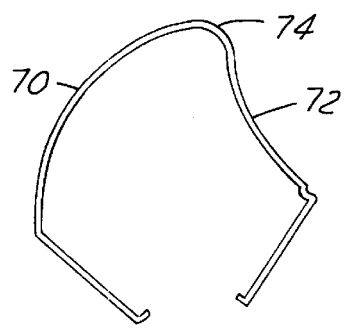
FIGS. 20–23 inclusive are cross sectional views of the sheet of material moving through a fourth series of roll forming assemblies.
Figure 17:
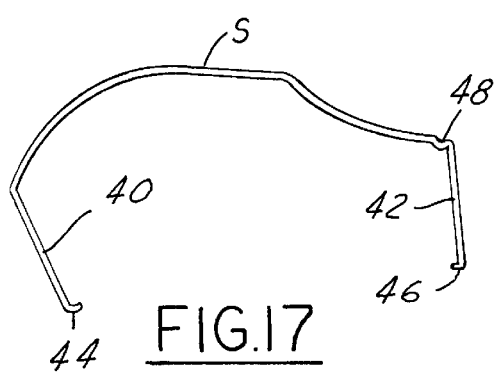
Figure 21:
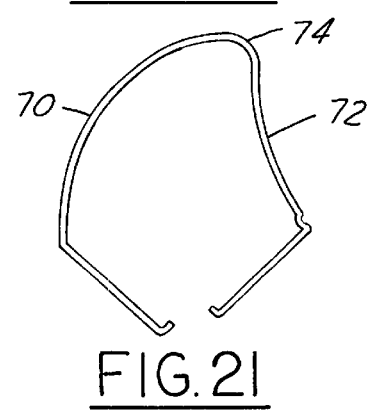
Figure 18:
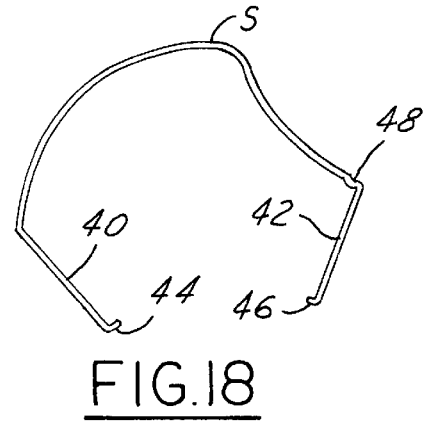
Figure 22:
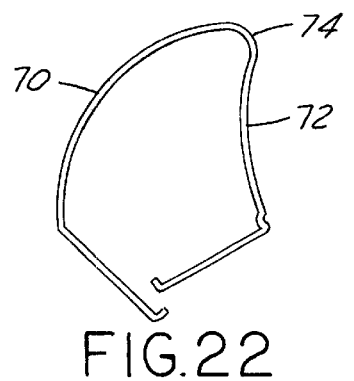
Figure 19:
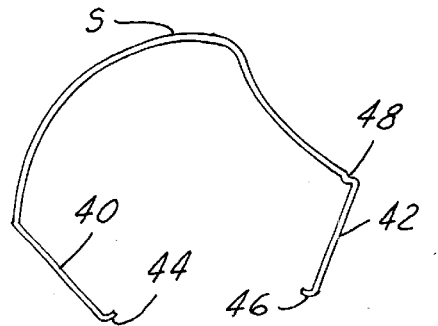
Figure 23:
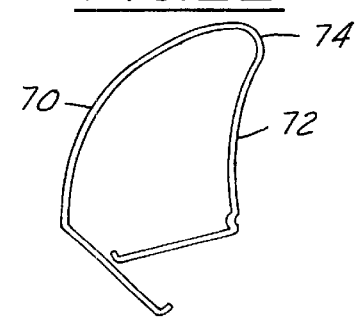
Figure 24:
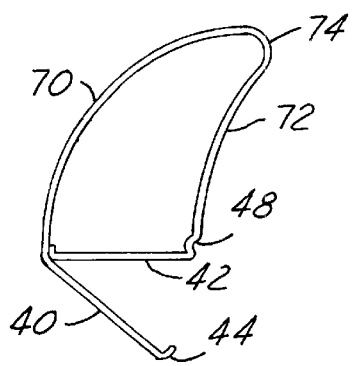
FIGS. 24–27 inclusive are cross sectional views of the sheet of material moving through a fifth series of roll forming assemblies.
Figure 28:
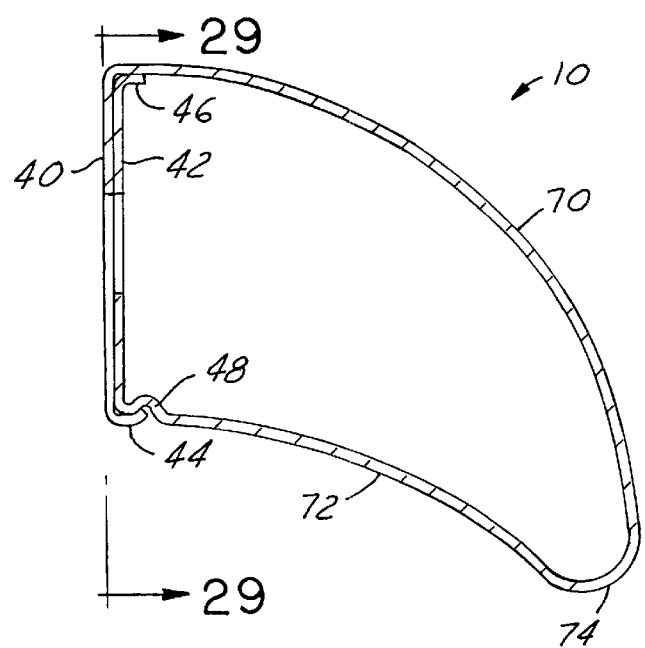
FIG. 28 is cross sectional view through the tubular member illustrating the integral rolled locking mechanism or system which extends the entire length of the tubular member and holds the tubular member in tension.
Figure 25:
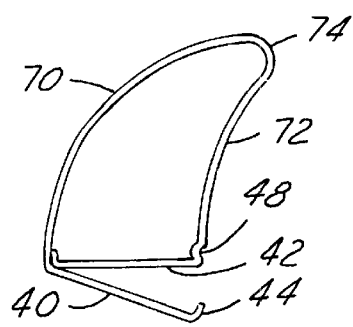
Figure 26:
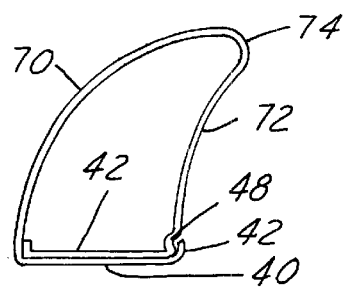
Figure 29:
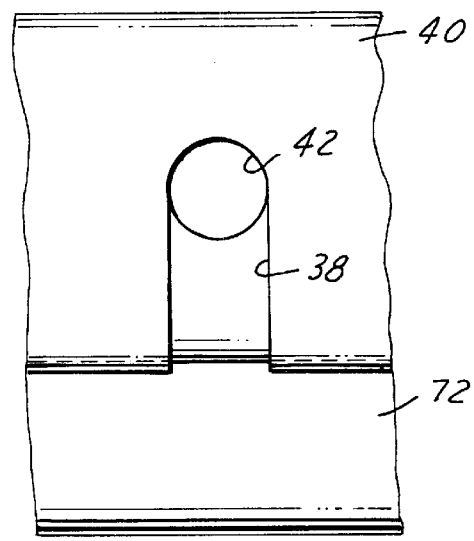
FIG. 29 is a fragmentary view of the mounting surface of the tubular member taken on the line 29—29 of FIG. 28 and illustrating the relationship between corresponding hole and slot for mounting the tubular bar on a support.
Figure 27:
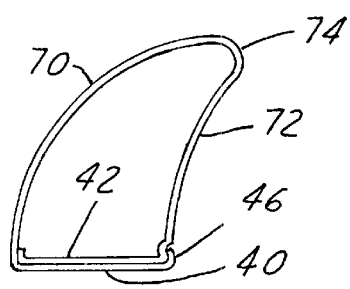

The present invention is directed to the method or process for making a rolled self-locking tubular member or bar 10 of predetermined length. A plurality of horizontally extending tubular bars 10 are vertically spaced apart and mounted on a screen 12 (FIG. 2), with the modular grill assembly 13 formed thereby mounted in the opening 14 of the hood 16 of a truck 18 fragmentally illustrated in FIG. 1. The truck 18 includes the usual tires 20, windshield 22 and truck body 24.

A schematic view of the apparatus 30 for forming the tubular bar 10 is shown in FIG. 7 and illustrates the unique process in producing the tubular bar. The roll forming apparatus 30, starting at the left side of FIG. 7, discloses a metal roll holder 32 which rotatably supports the roll 34 which contains a flat strip S of metal such as stainless steel, high carbon steel, cold rolled steel or aluminum. The strip S, of indeterminate length, has a predetermined width. The strip S initially moves through a prenotched die 36 where longitudinally spaced slots 38 are placed in one flange or edge portion 40 of the strip S while holes 41 located laterally from the notches 38 are longitudinally spaced apart in the other flange or edge portion 44 of the strip S. The notches 38 and holes 41 are used for mounting the resulting tubular bar 10 to a support surface as will subsequently appear.

The flat metal strip S passes from the pre-notch die 36 through five series of roll forming assemblies, each series consisting of four roll forming assemblies.

The first series of roll forming assemblies 50, 51, 52 and 53 as a strip S is passed therethrough gradually form the flanges 40 and 42 (FIGS. 8–11) which have at their outer edges lips 44 and 46 respectively. During the first series of roller forming operations, the elongated groove 48 is formed adjacent to the flange 42 as best illustrated in FIG. 11.

The sheet of material S moves through a second series of roll forming assemblies 54, 55, 56 and 57 where the assemblies bend the longitudinal edge portions of the sheet of material S (FIGS. 12–15) and form the flanges 40 and 42 in a generally parallel relationship as best illustrated in FIG. 15.

The sheet S of material moves through a third series of roll forming assemblies 58, 59, 60 and 61 which are of different shapes to direct the lips 44, 46 (FIGS. 16–19) provided on the opposing flanges 40 and 42 towards one another.

The sheet S of material moves through the fourth series of rollers which consists of roll assemblies 62, 63, 64 and 65 where the roller assemblies direct the flanges 40 and 42 (FIGS. 20–23) into an overlapping relationship and to partially form the curve side walls 70 and 72 and the connecting end portion 74.

The fifth and final series of roll assemblies comprises assemblies 66, 67, 68 and 69 where the final steps of the roll processing occurs to complete the moving of the sheet S of material and the formulation of the tubular bar by overlapping the flanges 40 and 42 (FIGS. 24–27), with the lip provided on the outer edge portion forming the one flange being received in the groove 48 located adjacent the one edge portion forging the other flange 42 thereby establishing a rolled locking mechanism which extends the entire length of the tubular member or bar and holds the tubular bar in tension due to the spring-back characteristics of the material. The rolled locking system holds the part or the tubular bar in tension without the aid of any mechanical fasteners, welding or crimping.

It should be appreciated that while twenty roll forming assemblies have been disclosed for illustration purposes only, the number of roller assemblies can be increased or decreased for other additional shapes to which the present process is directed.

At the end of the roll forming assembly 69 is located a conventional sweep apparatus 80 for producing the sweep (sweeping) of the tubular bar 10 as disclosed herein. This sweep producing or sweeping means 80 subjects the tubular member 10 to a sweep along it longitudinal axis to create a curvature consistent with the surface on which the tubular member is to be mounted. After the sweeping step has been performed, the tubular members 10 are cut at predetermined lengths by the convention cut off die 82 thereby continuously forming in succession a series of tubular bars 10 during the roll forming of the sheet of material S.

Referring now to FIGS. 1–6 inclusive, the modular truck grill 13 of approximately the same length is manufactured by taking, as an example, eight elongated tubular bars 10 and mounting them to extend horizontally and in vertically spaced relation on the screen 12. Each bar 10 has an elongated, horizontally extending strap 90 having a length greater than the length of the bar 10. Each strap 90 has a series of longitudinally spaced holes 92 which are spaced apart at the same distance as are the holes 41 provided in the bar 10. Rivets or fasteners 94 are provided for connecting the tubular bar 10 and strap 90 to the board 12 at various longitudinally spaced areas where the holes 41 and 92 are aligned with corresponding holes 96 provided in the screen 12. FIG. 3 shows the fastener or rivet 94 connecting the end of a strap 90 to the screen 12. Once each bar 10 and the corresponding strap 90 have been connected to the screen 12 by a plurality of rivets 94, the modular tubular grill 13 is ready for assembly in the opening 14 provided in the truck 18. The periphery of the screen 12 along the vertical edges 100 and horizontal edges 102 is provided with a series of mounting slots 96 for facilitating the insertion and mounting of the modular grill 13 in the truck opening 14. An elongated horizontal brace 104 is provided to assist in mounting and holding the grill 13 in place in the truck. Fasteners 106 retain the brace 104 and screen 12 in place. The modular grill 13, when installed on the vehicle 18, provides a decorative automotive design and appearance for the vehicle. Air flow to the engine is directed through the screen 12.

The tubular bars 10 are rolled sections which have an established width. Any width can be selected. The section selected is rolled on itself and is locked in place or together as the section comes off the roll mill. There are no secondaries involved such as having to weld the section together or to squeeze it to hold the section together. The present invention permits the rolled sections or tubes to be locked in place off the roll mill in a controlled width and within tolerance and customer's specifications without performing any secondaries and without any concerns for the rolled parts.

What I claim is:

1. A tubular bar comprising an elongated body formed to established width on a roll forming machine and having an integral locking mechanism, said body having a pair of interconnected side walls with inner and outer surfaces, each side wall having a flange extending towards the other side wall and terminating in a lip along the longitudinal edge thereof, said lips and said flanges extending the entire length of said body, with said flanges overlying one another, with the inner surface of one flange in surface to surface contact with the outer surface of the other flange, the outer surface of one side wall having an elongated groove extending from one end of said body to the other end, said groove receiving the elongated lip provided on the flange connected to the other side wall whereby said last mentioned lip and groove forms said locking mechanism which extends the entire length of said body and holds said body in tension.

2. The tubular bar of claim 1, wherein said side walls are of arcuate cross sections and are connected by a generally U-shaped section extending lengthwise of said body.

3. The tubular bar of claim 1, wherein said body is made from stainless steel.

4. The tubular bar of claim 1, wherein said body is made from high carbon steel.

5. The tubular bar of claim 1, wherein said body is made from cold roll steel.

6. The tubular bar of claim 1, wherein said body is made from aluminum.

7. The tubular bar of claim 1, wherein said body has a sweeping curvature along the longitudinal length thereof for matching the bar with the contour of a surface upon which it is to be mounted.

8. The tubular bar of claim 1, wherein said overlying flanges are provided with aligned openings for fasteners which permit the mounting of the tubular bar on a surface.

* * * * *